June 17, 1958    JIRO MUKAI    2,838,978
FOUR LENS PHOTOGRAPHIC OBJECTIVE
Filed May 23, 1956
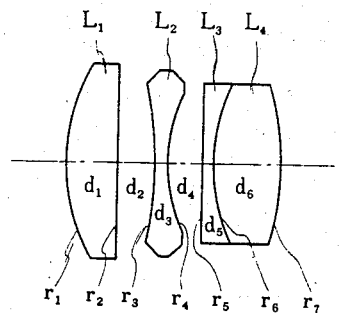
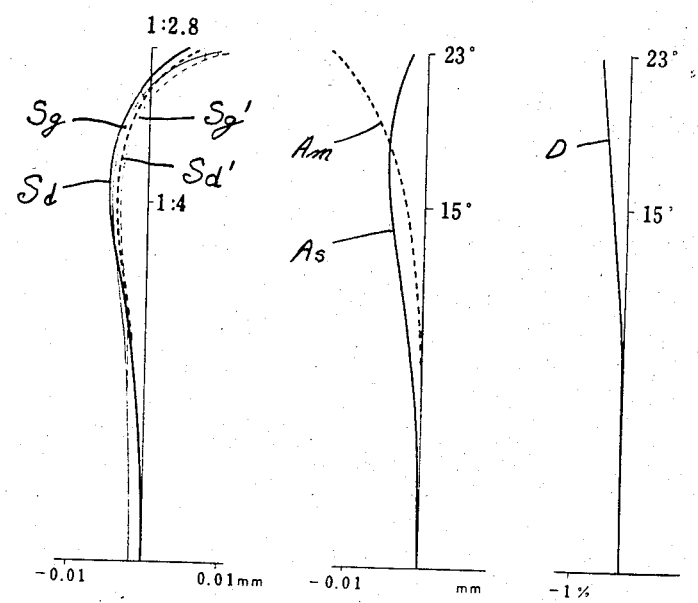
INVENTOR.
JIRO MUKAI
BY
ATTORNEY

United States Patent Office 2,838,978
Patented June 17, 1958

2,838,978
FOUR LENS PHOTOGRAPHIC OBJECTIVE

Jiro Mukai, Musashino City, Tokyo, Japan, assignor to Canon Camera Company, Inc., Otaku, Tokyo, Japan, a corporation of Japan Application May 23, 1956, Serial No. 586,691

Claims priority, application Japan November 12, 1955

1 Claim. (Cl. 88—57)

This invention relates to a four lens photographic objective and more particularly to an improvement in triplet arrays comprising four lenses.

An object of this invention is to minimize various aberrations such as chromatic, spherical, distortional and others as compared to conventional lenses, and more particularly to correct coma, astigmatism and distortion most effectively.

A clear concept of the scope and purpose of this invention may be obtained from the following description, taken in connection with the attached drawing, in which:

Fig. 1 is a sectional view of an illustrative embodiment of the objective according to this invention, the objective having an angle of field 46° and an aperture of F:2.8;

Fig. 2 shows the curves for the spherical aberration and the deviation from the sine condition, in which graph $S_d$ represents the spherical aberration for the $d$-line of the spectrum, $S_d'$ the deviation of the $d$-line of the spectrum from the sine condition, $S_g$ the spherical aberration of the spectrum $g$-line, and $S_g'$ the deviation of the $g$-line from the sine condition;

Fig. 3 shows the graph of the astigmatism, graph $A_s$ representing the sagital field curvature and $A_m$ the meridional field curvature; and Fig. 4 shows the distortion graph D for each angle of incidence.

This invention proposes an improved construction of the three component or triplet objective consisting of four lens elements. The first component $L_1$ is a positive meniscus lens with its convex surface towards the object side, the second component $L_2$ being negative bi-concave with its stronger concave surface towards the image side, and the third component consists of a negative lens $L_3$ and a positive lens $L_4$ with the convex surface of their intercemented surfaces facing towards the object.

The triplet objective of the instant invention is constructed according to the following requirements:

(1) The difference between the refractive indices for the $d$-line of the spectrum of the cemented lens elements $L_3$ and $L_4$ of the third component ($n_4 - n_3$), lies between 0.166 and 0.2;

(2) The thickness $d_6$ on the optical axis of the last positive lens member $L_4$ lies between 0.1 $f$ and 0.15 $f$ wherein $f$ is equivalent focal length of the objective;

(3) Air space $d_2$ between the first component $L_1$ and the second component $L_2$ lies between 0.045 $f$ and 0.075 $f$;

(4) The average value of the refractive indices for the $d$-line of the spectrum of the positive lens members $L_1$ and $L_4$, that is, $$\left(\frac{n_1+n_4}{2}\right)$$

lies between 1.65 and 1.75;

(5) The average value of the refractive indices for the $d$-line of the spectrum of the negative lens members $L_2$ and $L_3$, that is, $$\left(\frac{n_2+n_3}{2}\right)$$

lies between 1.5 and 1.6;

(6) The ratio $$\frac{r_2}{r_1}$$

of the radii of curvature of the second surface $r_2$ and the first surface $r_1$ of the first component $L_1$ lies between 18 and ∞;

(7) The radius of curvature of the front surface $r_3$ of the second component $L_2$ lies between $-0.6\,f$ and $-0.84\,f$, wherein $r_1$, $r_2$ . . . represent the radii of curvature of the successive optical surfaces counting from the front of the objective; $d_1$, $d_2$, . . . represent the axial thicknesses and the air spaces of each element; $n_1$, $n_2$, . . . represent the refractive index for $d$-line of the spectrum of each element $L_1$, $L_2$, . . ., and $\nu_1$, $\nu_2$, . . . represent Abbe's dispersive index thereof. Generally speaking, giving the difference in the refractive indices for the $d$-line of the spectrum of the cemented lens elements $L_3$ and $L_4$ of the third component as large a value as possible serves to decrease coma, however, the meridional image plane is curved considerably towards the side of objective.

In this invention, however, by imposing the above mentioned condition (1) that $0.2 > (n_4 - n_3) > 0.166$, the coma is corrected and the curve of the meridional image plane is rectified by conditions (2) and (3) that $0.1\,f < d_6 < 0.15\,f$ and $0.045\,f < d_2 < 0.075\,f$ mentioned above. Also by the above mentioned conditions (4) and (5) that $$1.65 < \left(\frac{n_1+n_4}{2}\right) < 1.75 \text{ and } 1.5 < \left(\frac{n_2+n_3}{2}\right) < 1.6$$

the Petzval sum is minimized and a flat image plane is obtained by limiting in the above mentioned conditions (6) and (7) that $$18 < \left(\frac{r_2}{r_1}\right) < \infty \text{ and } 0.6\,f < |r_3| < 0.84\,f$$

Thus it is quite obvious that chromatic, spherical, distortional and other aberrations as mentioned above can be minimized as compared with the conventional lenses and more particularly a high grade triplet lens is obtainable that remarkably corrects the comatic, astigmatic and distortional aberrations.

An example of the embodiments according to this invention is given below:

[$f=1$    $2\alpha=46°$    $F=2.8$.]

| Element | Radius | Thickness Spacing | Refractive Index | Abbe Number |
|---|---|---|---|---|
| $L_1$ | $r_1=0.379$ | $d_1=0.097$ | $n_1=1.6583$ | $\nu_1=57.3$ |
|  | $r_2=9.205$ | $d_2=0.072$ |  |  |
| $L_2$ | $r_3=-0.741$ | $d_3=0.027$ | $n_2=1.5930$ | $\nu_2=34.3$ |
|  | $r_4=0.310$ | $d_4=0.061$ |  |  |
| $L_3$ | $r_5=\infty$ | $d_5=0.021$ | $n_3=1.5111$ | $\nu_3=60.6$ |
| $L_4$ | $r_6=0.348$ | $d_6=0.136$ | $n_4=1.6910$ | $\nu_4=54.8$ |
|  | $r_7=-0.549$ |  |  |  |

What I claim is:

A photographic objective corrected for spherical and chromatic aberration, coma, astigmatism, field curvature and distortion, comprising a single element front component $L_1$ in the form of a collective meniscus with its convex surface having the curvature $r_1$ toward the object side of the objective, a second single element component $L_2$ is a dispersive biconcave element air spaced from the first component with its stronger concave surface of curvature $r_4$ towards the image side, and a third component spaced from the second component comprises a dispersive element $L_3$ cemented to a collective element $L_4$, the cemented surface of the convex curvature $r_6$ facing the object side, wherein the radii of curvature $r_{subscript}$ of the lens elements $L_{subscript}$, the distances $d_{subscript}$ along the optical axis, the refractive indices $n_{subscript}$ and the Abbe numbers $v_{subscript}$ of the lens elements, the subscripts increasing in the direction from the object to the image side of the objective, are as follows:

[$f=1$  $2\alpha=46°$  $F=2.8$.]

| Lenses | Radii | Thickness Spacings | Refractive Index | Abbe Number |
|---|---|---|---|---|
| $L_1$ | $r_1=0.379$ | $d_1=0.097$ | $n_1=1.6583$ | $v_1=57.3$ |
|  | $r_2=9.205$ | $d_2=0.072$ |  |  |
| $L_2$ | $r_3=-0.741$ | $d_3=0.027$ | $n_2=1.5930$ | $v_2=34.3$ |
|  | $r_4=0.310$ | $d_4=0.061$ |  |  |
| $L_3$ | $r_5=\infty$ | $d_5=0.021$ | $n_3=1.5111$ | $v_3=60.6$ |
|  | $r_6=0.348$ | $d_6=0.136$ | $n_4=1.6910$ | $v_4=54.8$ |
| $L_4$ | $r_7=-0.549$ |  |  |  |

References Cited in the file of this patent

UNITED STATES PATENTS

| | | |
|---|---|---|
| 721,240 | Rudolph | Feb. 24, 1903 |
| 2,158,178 | Frederick et al. | May 16, 1939 |
| 2,732,762 | Lange et al. | Jan. 31, 1956 |

FOREIGN PATENTS

| | | |
|---|---|---|
| 609,669 | Great Britain | Oct. 5, 1948 |
| 1,057,720 | France | Oct. 23, 1953 |
| 706,605 | Great Britain | Mar. 31, 1954 |
| 1,120,790 | France | Apr. 23, 1956 |